W. E. DRESSEL.
SLUDGE REMOVER AND AGITATOR FOR GAS GENERATORS.
APPLICATION FILED MAY 8, 1915.
1,182,151.
Patented May 9, 1916.
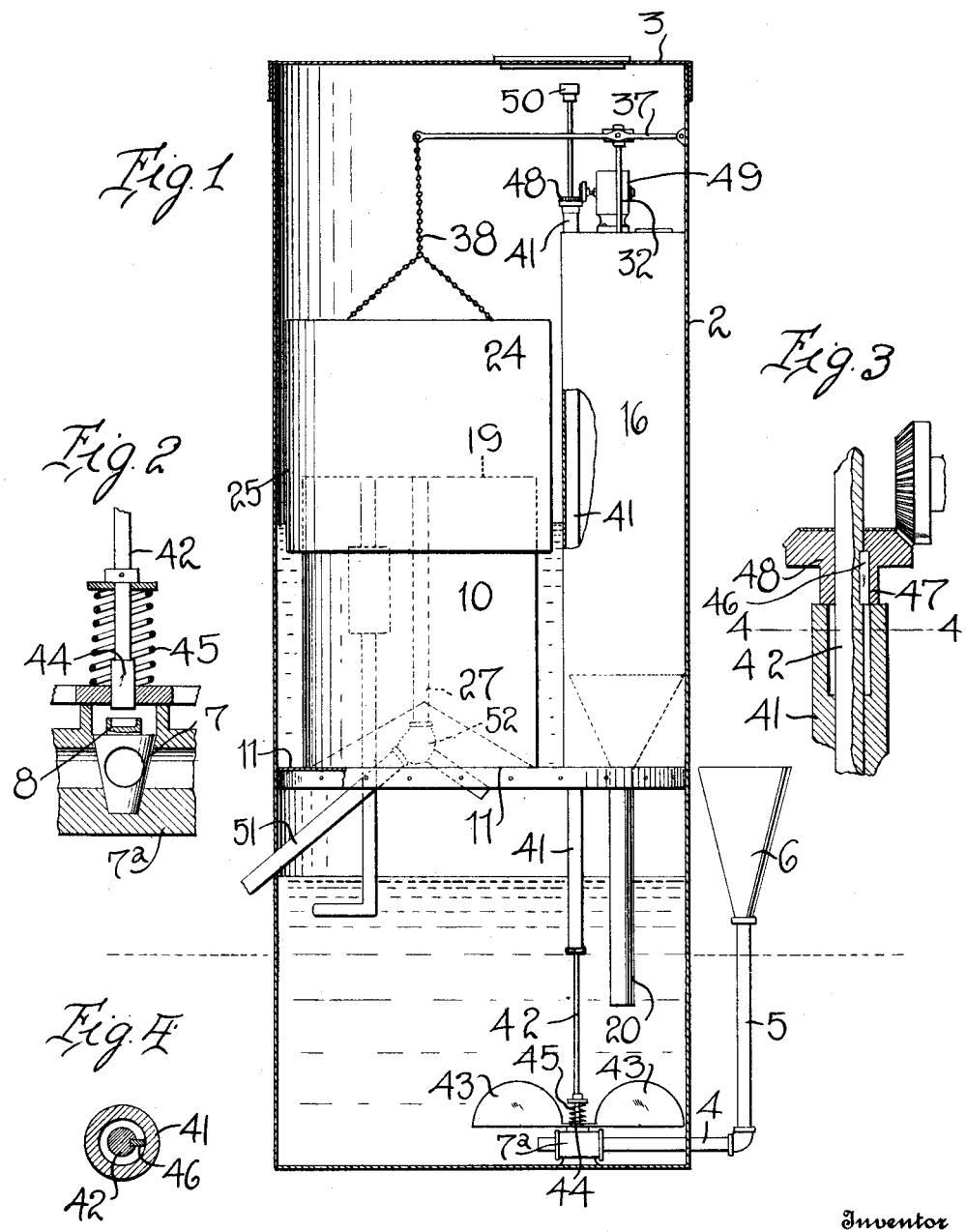
Inventor
W. E. DRESSEL
By Watson E. Coleman
Attorney

UNITED STATES PATENT OFFICE.

WARREN E. DRESSEL, OF EDWARDSVILLE, ILLINOIS.

SLUDGE REMOVER AND AGITATOR FOR GAS-GENERATORS.

1,182,151.  Specification of Letters Patent.  Patented May 9, 1916.

Original application filed February 27, 1915, Serial No. 11,012. Divided and this application filed May 8, 1915. Serial No. 26,887.

*To all whom it may concern:*

Be it known that I, WARREN E. DRESSEL, a citizen of the United States, residing at Edwardsville, in the county of Madison and State of Illinois, have invented certain new and useful Improvements in Sludge Removers and Agitators for Gas-Generators, of which the following is a specification, reference being had to the accompanying drawings.

This invention relates to acetylene gas generators, and more particularly to improvements in the sludge removing and agitating means therefor and means whereby water may be filled into the generator, this application being a division of the application filed by me for acetylene gas generator, on February 27, 1915, Serial No. 11,012.

The primary object of this invention is the provision, in connection with the sludge removing and water inlet pipe, of agitating blades, a valve, and common means for either rotating the valve to control the entrance of water to the generating chamber or control the removal of sludge therefrom, or for rotating said blades.

A further object of the invention is the provision of agitator blades disposed within the bottom of the generating chamber, and the provision of a shaft adapted to be connected either to the agitator blades or to a valve controlling the passage of water into the generating chamber or the removal of sludge therefrom, and further in the means whereby the shaft may be operatively connected to a motor when disconnected from the valve so as to cause the actuation of the agitating blades.

Other objects will appear in the course of the following description.

My invention is illustrated in the accompanying drawings, wherein:

Figure 1 is a longitudinal section of an acetylene gas generator with my improvements applied thereto; Fig. 2 is a vertical sectional view of the sludge removing and the water inlet valve; Fig. 3 is a fragmentary vertical sectional view showing the connection between the motor and the valve and the agitator shaft; Fig. 4 is a cross section on the line 4—4 of Fig. 3 with the shaft and key disengaged from the gear wheel.

In Fig. 1 I have shown the general features of an acetylene gas generator such as described in detail and claimed in my pending application before referred to, of which application this is a division. In these figures, 2 designates the exterior tank or container which may be cylindrical in form and closed by a removable cover 3. Entering into the lower portion of this tank is a pipe 4 whereby water may be admitted to the lower portion of the tank or sludge withdrawn therefrom. This pipe 4 at its outer end extends upward, as at 5, above the ground line, and is provided at its upper end with a funnel 6 whereby water may be filled into the tank, this funnel being removable to permit the application of a sludge removing pump or other sludge removing means to the pipe.

The passage of water through the pipe 4 into the tank, or the passage of sludge out of the tank, is controlled by means of a valve 7 which is illustrated in Fig. 2 as a rotatable valve and disposed within a valve casing 7ª. This valve is adapted to be rotated by a means which will be hereafter described. The upper portion of the tank is divided from the lower portion by means of a cylindrical member having a head 9 and downwardly extending walls 10. This wall 10 at its lower end is connected to the wall of the container by means of a web 11. The member 9 has the form of a segment of a circle so as to provide room for a carbid chamber 16 which extends downward from the upper end of the tank 2 to the web 11. From the chamber 16 extends a delivery tube 20, and suitable means is provided for feeding carbid through this delivery tube. Inasmuch as this means has nothing to do with the present invention, and inasmuch as it is fully described in my prior application above referred to, I have not considered it necessary to illustrate or describe this carbid feeding means.

Disposed above the member 9 is a gas bell 24 having a depending side wall 25 which extends into the space between the wall 10 and the wall of the tank 2, and on one side between the wall 10 and the wall of the carbid casing 16. This bell 24 dips into the water which surrounds the wall 10 and thus the gas bell is sealed. The pipe 27 opens into the space below the web 11 and into the space above the head 9 so as to permit the passage of gas from the generating chamber into the gas bell 24, and this pipe is provided with a valve, designated generally 52, whereby the entrance of gas into the pipe 27 from the generating chamber may be prevented and gas from the chamber may be allowed to flow off through the pipe 51. The bell 24 is connected by means of a chain 38 to a pivoted arm 37 which in turn controls the carbid feed through the shaft 32.

For the purpose of operating the valve 7, I provide the vertically extending shaft 42 which passes through a tube 41 which has gas-tight connection with the upper and lower end of the casing 16, and which extends down into the water contained in the lower portion of the tank 2 and is thus sealed from the passage of gas. The lower end of the shaft 42 carries upon it agitator blades 43. The lower end of the shaft is formed to provide a head 44, many sided in form, which passes through the web connecting the agitator blades, as shown clearly in Fig. 2, and this head is adapted to engage with a socket formed in the upwardly extending valve stem 8 on the valve 7.

A spring 45 encircles the lower end of the shaft 42 and bears at its upper end against the collar, while the lower end of the spring bears against the agitator blades. The agitator blades have rotatable engagement with the valve casing both when the shaft 42 is depressed and when it is in its raised position. The spring 45 normally urges the shaft 42 upward so as to carry the head 44 out of engagement with the valve. Therefore the agitators 43 may be ordinarily rotated by a suitable motor without affecting the valve, but when it is desired to engage the shaft 42 with the head 8, the shaft 42 is manually depressed, which depression, as will be hereafter explained, carries it out of engagement with the motor mechanism and then the shaft 42 may be rotated by means of a wrench applied to its upper end, thus opening or closing the valve 7.

While I do not wish to limit myself to the use of a motor connection with the shaft 42, as the shaft might be rotated by hand to operate the agitator blades, yet preferably I provide an electrical motor 49, which may be of any suitable construction and which may be geared in any desired manner to the shaft 42 in a way which will permit the shaft 42 to have vertical movement and which will disconnect the shaft 42 from the motor upon the depression of the shaft. Thus, as illustrated in Fig. 3, the shaft carries upon it a spline or feather 46, which, when the shaft is raised, engages in the key way 47 formed in the gear wheel 48, which gear wheel is operatively connected to the motor 49. Thus when the shaft is raised under the action of the spring 45, the shaft will be operatively engaged with the motor and rotated thereby to cause the rotation of the agitator blades 43. When it is desired to operate the valve, the manhole cover in the top of the tank 2 is removed, a wrench is inserted to engage the upper end 50 of the shaft 42, the shaft is depressed against the spring 45 and engages with the valve 7 in a manner previously described, and when the shaft is rotated by the wrench the valve will be rotated to establish or disestablish communication between the pipe 4 and the interior of the generating chamber. At this time water may be filled into the generating chamber through the pipe 6, or the sludge in the bottom of the generating chamber may be removed.

While I have illustrated certain details of construction as regards the valve and the manner in which the shaft 42 is engaged therewith and the manner in which the shaft 42 engages the agitator blades, and also certain details of construction with regard to the engagement of the shaft with the gear 48, I wish it understood that these details might be changed or modified without departing from the spirit of the invention.

Having thus described my invention, what I claim is:

1. In a gas generator, a generating chamber, a pipe entering the generating chamber and adapted to permit the inlet of water or the removal of sludge, a valve controlling passage through said pipe, a rotatable shaft having means whereby it may be entirely engaged with or disengaged from the said valve, and agitator blades carried upon the shaft, said shaft when disengaged from the valve operating to rotate the agitator a plurality of times without in any way affecting the valve.

2. In a gas generator, a generating chamber, a pipe entering the generating chamber and forming the means whereby water may be filled into the generating chamber or sludge removed therefrom, a valve controlling the passage through said pipe, a vertically movable rotatable shaft normally yieldingly supported out of engagement with the valve but depressible into rotative engagement with the valve, and agitator blades carried by the shaft.

3. In a gas generator, a generating chamber, a pipe entering the generating chamber and forming means whereby water may be filled thereinto or sludge removed therefrom, a valve controlling the passage through said pipe, a rotatable shaft vertically movable into operative connection with said valve but normally held from said connection, agitator blades carried upon the shaft, and means whereby said shaft may be rotated.

4. In a gas generator, a generating chamber, a pipe entering the generating chamber and forming means whereby water may be filled thereinto or sludge removed therefrom, a valve controlling the passage through said pipe, a rotatable shaft vertically movable into operative connection with said valve but normally held from said connection, agitator blades carried upon the shaft, and motor operated means for rotating said shaft.

5. In a gas generator, a generator chamber, a pipe entering said chamber and forming the means whereby water may be filled into said chamber or sludge removed therefrom, a valve controlling the passage of water through the pipe, a vertically movable shaft extending through the generator and adapted at its lower end to rotatively engage said valve when the shaft is depressed, a spring normally holding the shaft raised from its engagement with the valve, agitator blades carried on the shaft, and means whereby the shaft may be manually rotated.

6. In a gas generator, a generating chamber, a pipe entering said chamber and forming the means whereby water may be filled into said chamber or sludge removed therefrom, a valve controlling the passage of water through the pipe, a vertically movable shaft extending through the generator and adapted at its lower end to rotatively engage said valve when the shaft is depressed, a spring normally holding the shaft raised from its engagement with the valve, agitator blades carried on the shaft, means whereby the shaft may be manually rotated, and means whereby the shaft may be rotated by power.

7. In a gas generator, a gas generating chamber, a pipe entering said chamber and forming the means whereby water may be filled into said chamber and sludge removed therefrom, a valve controlling the passage through the pipe having a socket in its upper end, a vertically movable shaft extending through the generator and adapted at its lower end to engage said socket when the shaft is depressed to rotate said valve, a spring normally holding the shaft out of engagement with the socket, agitator blades carried on the shaft, and motor operated means for rotating the shaft when it is raised, said shaft when depressed being disconnected from the motor operated means and rotatable by hand.

8. In a gas generator, a generating chamber, a valve controlling the entrance of liquid to or the passage of sludge from the chamber, an agitator disposed within the chamber, and a single operating means for the valve and the agitator shiftable into operative engagement with the valve or entirely out of operative engagement therewith, and at this time permitting the agitator to be rotated a plurality of revolutions without affecting the valve.

In testimony whereof I hereunto affix my signature in the presence of two witnesses.

WARREN E. DRESSEL.

Witnesses:
HAROLD B. SANDERS,
A. T. WOLF.

Copies of this patent may be obtained for five cents each, by addressing the "Commissioner of Patents, Washington, D. C."